United States Patent [19]
Seidel et al.

[11] Patent Number: 5,992,797
[45] Date of Patent: Nov. 30, 1999

[54] DUAL UPPER DECK AIRPLANE

[75] Inventors: Gerhard E. Seidel, Redmond; Mithra Sankrithi, Seattle, both of Wash.

[73] Assignee: The Boeing Company, Seattle, Wash.

[21] Appl. No.: 09/157,086

[22] Filed: Sep. 18, 1998

[51] Int. Cl.⁶ .......................... B64D 11/00; B64D 13/00
[52] U.S. Cl. .............................. 244/118.5; 244/118.6; 244/119; 244/120; 244/130
[58] Field of Search .......................... 244/118.1, 118.5, 244/118.6, 119, 120, 130, 137.2

[56] References Cited

U.S. PATENT DOCUMENTS

| | | | |
|---|---|---|---|
| 3,405,893 | 10/1968 | Flamand et al. | 244/119 |
| 4,022,404 | 5/1977 | Greiss | 244/118.1 |
| 4,674,712 | 6/1987 | Whitener et al. | 244/119 |
| 4,925,132 | 5/1990 | Zider | 244/118.1 |
| 5,086,996 | 2/1992 | Roeder et al. | 244/119 |
| 5,115,999 | 5/1992 | Buchsel et al. | 244/118.5 |
| 5,542,626 | 8/1996 | Beuck et al. | 244/107 |
| 5,611,503 | 3/1997 | Brauer | 244/118.6 |
| 5,784,836 | 7/1998 | Ehrick | 244/118.5 |
| 5,875,997 | 3/1999 | Al-Sabah | 244/118.5 |

*Primary Examiner*—J. Woodrow Eldred
*Attorney, Agent, or Firm*—Christensen O'Connor Johnson & Kindness PLLC

[57] ABSTRACT

An improvement to a subsonic passenger aircraft is provided. The passenger aircraft has a fuselage including a main passenger seating deck (14) including forward, middle, and aft regions. The fuselage includes an upper forward deck (16) located above the main passenger seating deck forward region and accessible thereto. Both the main deck and upper forward deck having doors (30), (26) therein for passenger and supplies ingress and egress. The fuselage includes an aft upper deck (18) located above the main passenger seating deck aft region and accessible from the main deck. An upper middle region (20) is located above the main deck middle region. In one embodiment, the upper middle region (20) is of a height elevationally less than either of the forward and aft upper decks. The cross-sectional area of the fuselage at the upper middle region is less than the cross-sectional area of the fuselage at either the forward upper deck region or the aft upper deck region. In another embodiment, the forward upper cabin and the aft upper cabin are separate, longitudinally non-adjacent cabins for accommodating seated passengers.

19 Claims, 5 Drawing Sheets

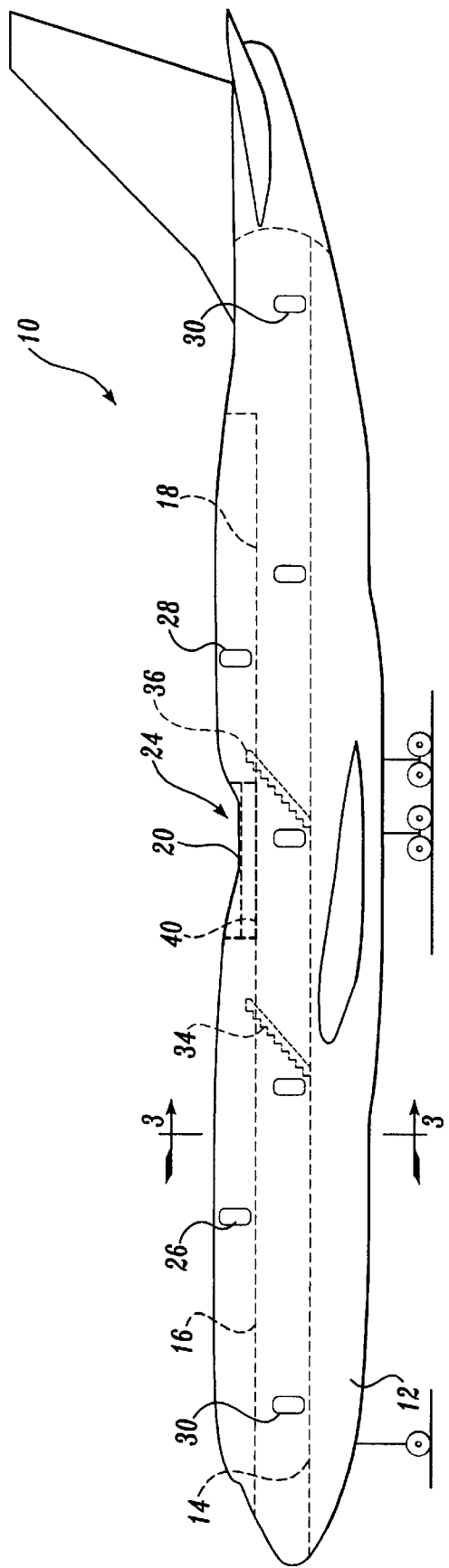
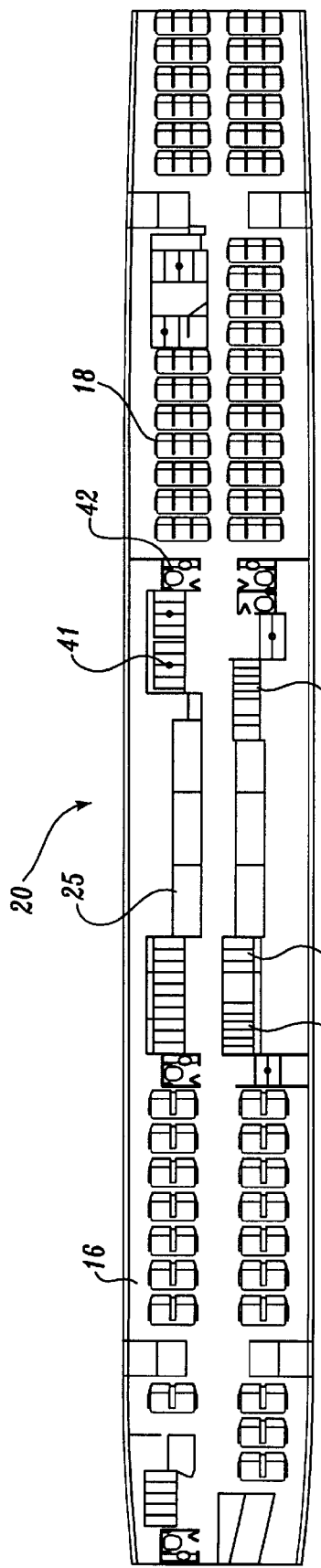
Fig. 2A.
Fig. 2B.

DUAL UPPER DECK AIRPLANE

FIELD OF THE INVENTION

The present invention relates to large airplanes, and more particularly, to large airplane configurations having a forward upper passenger seating deck.

BACKGROUND OF THE INVENTION

The profitability of an airline is directly related to the number of passengers and the amount of cargo-carrying space its planes are equipped to transport. The greater the passenger seating space, the greater the potential passenger revenues. Similarly, the greater the cargo-carrying space, the greater are the potential cargo revenues. Therefore, an airline can increase its profitability by increasing passenger seating space and cargo-carrying capability.

One method of increasing airplane passenger and cargo space is to increase the length of the craft's fuselage. This process is commonly known as "stretching". There are a number of problems associated with stretching an airplane, including a reduction in the aft body rotation clearance, disproportionate growth of the lower cargo space, a reduction in airplane maneuverability in and around airports, and a reduction in the ability to park the aircraft in length-constrained airport gates.

A second method of increasing passenger and cargo space is to use a full length main seating deck and an additional upper seating deck provided either over the entire length of the fuselage, over a forward upper area, or over an aft upper area. Increasing passenger space by use of a forward, an aft, or a full upper deck is generally preferred to stretching an aircraft because the resulting airplane is easier to maneuver at airports and is capable of larger rotation angles during takeoff and landing. Such a craft also has reduced fuselage wetted area per seat and hence reduced skin friction drag on a per seat basis.

There are a number of problems associated with attempting to design a viable full upper deck airplane. One problem is that it is difficult to design a large airplane with a full upper deck that includes non-conflicting escape routes from both the main and upper decks. For a full upper deck or cabin airplane configuration, a sufficient number of doors fitted with deployable escape slides must be provided on the upper deck as well as on the main deck, in order to allow all passengers to quickly exit the plane during an emergency situation. These doors must be spaced no more than sixty feet apart longitudinally in order to meet United States Federal Aviation Regulations. In many cases, there will be a resulting high risk that upper deck slides, while deploying or deployed, are impacted by or otherwise conflict with nearby lower deck slides and/or with the wing of the airplane. This becomes a particularly challenging issue for a large airplane configuration with a long root chord, low wing. Another problem in designing a viable full upper deck configuration, is that dual deck craft have distributions of area-rule cross-sectional area verses longitudinal position that are significantly non-optimal. Thus, full upper deck configurations typically suffer from relatively high levels of transonic drag.

Accordingly, a need exists for an improved large airplane configuration having increased seating capacity relative to a single deck configuration, without an excessively long fuselage body and without incurring the evacuation challenges or performance disadvantages of a full upper deck. The present invention is directed to fulfilling this need.

SUMMARY OF THE INVENTION

In accordance with the teachings of the present invention, an improvement is provided to a non-supersonic passenger aircraft having a fuselage including a main passenger seating deck including forward, middle, and aft regions. The fuselage includes an upper forward deck located above the main passenger seating deck forward region and accessible thereto. Both the main deck and upper forward deck have doors therein for passenger ingress and egress. The fuselage includes an aft upper deck located above the main passenger seating deck aft region and accessible from the main deck and an upper middle region located above the main deck middle region and having a height that is elevationally less than either of the forward and aft upper decks. The cross-sectional area of the fuselage at the upper middle region is less than the cross-sectional area of the fuselage at either the forward upper deck region or the aft upper deck region.

In accordance with other aspects of this invention, a passenger transport aircraft is provided having a wing and a fuselage. The fuselage includes a main cabin for accommodating seated main cabin passengers, the main cabin having forward, middle, and aft regions. A forward upper cabin for accommodating seated forward upper cabin passengers is situated substantially above the main cabin forward region. The forward upper cabin includes at least one pair of forward upper cabin doors for permitting the forward upper cabin passengers to evacuate the forward upper cabin in an emergency situation. An aft upper cabin for accommodating seated aft upper cabin passengers is situated substantially above the main cabin aft region. The aft upper cabin includes at least one pair of aft upper cabin doors for permitting the aft upper cabin passengers to evacuate the aft upper cabin in an emergency situation. The forward upper cabin and the aft upper cabin are separate, longitudinally non-adjacent cabins for accommodating seated passengers.

In accordance with yet other aspects of this invention, one embodiment of the upper middle region is formed as an unpressurized fairing that provides no connection between the forward and aft upper decks. In a second embodiment the upper middle region includes a pressured carry-through segment having a passageway that connects the forward and aft upper decks. In select alternative configurations, this pressurized segment is used for sleeping, lavatory, storage, and/or galley facilities.

In accordance with further aspects of this invention, select embodiments include an overall fuselage cross-sectional area that is reduced in the longitudinal region between the forward and aft upper decks, yielding a beneficial "area-ruling" drag reduction effect in transonic flow. In one embodiment the fuselage exterior surface crown line at the middle region is in the range of about 0.5 meters to about 1.5 meters lower than the crown line of the forward upper region exterior surface.

In accordance with yet further aspects of this invention, select embodiments include location of the wing below the level of the main cabin. Alternative embodiments include location of the wing above the level of the main cabin. The forward upper cabin preferably includes at least one stairway connecting it to the main deck forward region, and the aft upper cabin preferably includes at least one stairway connecting it to the main deck aft region.

In accordance with still other aspects of this invention, the forward upper deck includes at least one pair of evacuation side doors and the aft upper deck includes at least one pair of evacuation side doors; the forward upper deck and the aft upper deck being treated as separate cabins for evacuation purposes. In one embodiment, the longitudinal distance between the aft edge of the aftmost door of the forward upper cabin and the forward edge of the forwardmost door of the aft upper cabin exceeds sixty feet.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2A is a side view of a second embodiment of a dual upper deck airplane formed in accordance with the present invention;

FIG. 2B is a plan view of one arrangement of a second embodiment middle upper region having a number of crew sleeping facilities;

DETAILED DESCRIPTION OF THE PREFERRED EMBODIMENT

Figure 1:
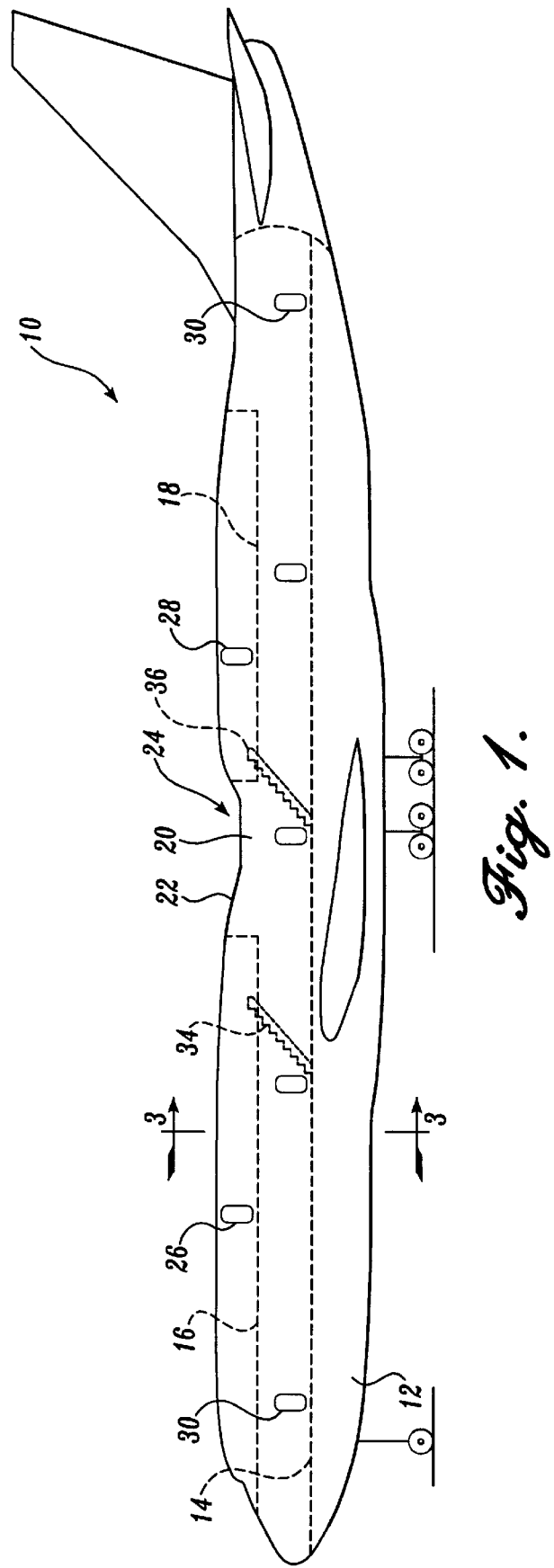
FIG. 1 is a side view of one embodiment of a dual upper deck airplane formed in accordance with the present invention.

Referring to FIGS. 1 and 2A, two embodiments of a dual upper deck airplane 10 formed in accordance with the present invention are provided. The craft includes a fuselage 12 having a main passenger seating deck 14, a forward upper passenger seating deck 16, and an aft upper passenger seating deck 18. The forward upper deck is located aft of the cockpit. The aft upper deck 18 is substantially located behind the center-section of the wing. A middle upper region 20 is situated at a longitudinal location between the forward and aft upper decks. The middle region includes a cross-sectional area that is significantly smaller than either of the cross-sectional areas of the forward or aft upper decks. The middle upper region is not available for passenger seating and hence is not considered to be a passenger seating cabin. The middle upper region may be formed in a variety of ways, including the embodiments described below and shown in FIGS. 1, 2A, and 2B.

Figure 3:
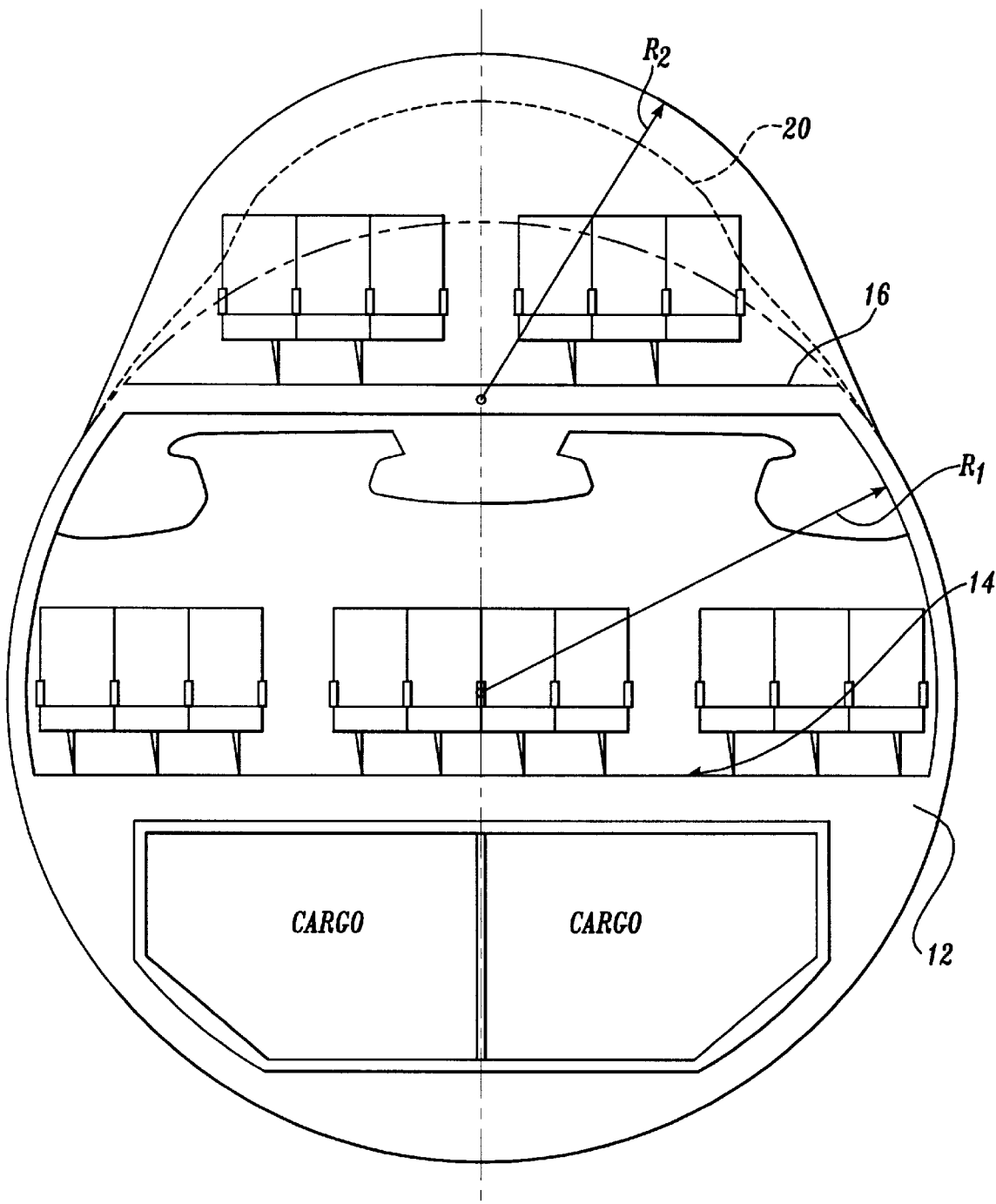
FIG. 3 is a cross-sectional view taken along lines 3—3 of FIGS. 1 and 2.

In the embodiment of FIG. 1, the middle region 20 includes a fairing 22 that transitions the outer fuselage shape between the forward and aft upper passenger decks. The middle region itself, though formed as a part of the fuselage, is separate from the cabin structures and therefore may not be pressurized. FIG. 3 illustrates a representative fuselage cross-section in the double-deck regions, which are preferably formed as the combination of a lower circle having radius $R_1$ and an upper circle having radius $R_2$ that is smaller than $R_1$. Other, non-circular arcuate shapes may be used. In one embodiment, the fuselage at the forward double deck is similar in cross-sectional size to the fuselage section at the aft double deck. The fuselage region located between the forward and aft double decks has a cross-sectional shape corresponding to the lower circle only. The middle region fairing is of less height than either of the forward or aft double deck fuselage portions. This gives the upper surface of the fuselage an appearance of having two "humps", or conversely, a middle "dip", as shown in FIG. 1 and labeled item 24.

Still referring to the embodiment of FIG. 1, the middle region 20 does not include a through passage or connection between the forward and aft upper decks in any way. To exit the airplane during emergencies, one or more side door pairs 26, 28 are available in each of the forward and aft upper decks, respectively. The main deck 14 includes a number of pairs of side doors 30 spaced longitudinally along the fuselage. The exit doors are preferably conventional type "A" doors. It is important to alternate the placement of the upper deck exit doors longitudinally with the main deck exit doors, so that their respective evacuation slides will not interfere with one another during use. Further, one or more stairs are provided between the forward upper deck and the main deck as indicated at item 34, and between the aft upper deck and the main deck as indicated at item 36.

A second embodiment of a dual upper deck airplane formed in accordance with the present invention is shown in FIG. 2A. In this embodiment, the middle region 20 is similar to the first embodiment, including having a reduced cross-sectional area relative to the forward and aft double deck cross-sectional areas. The middle region of the second embodiment, however, further includes a structural carry-through segment 40 in which a pressurized passageway is provided to connect between the forward and aft upper decks. Alternatively, the middle upper region may be pressurized and used for crew and/or passenger sleeping facilities, lavatories, galleys, stowage and/or other storage uses. FIG. 2B illustrates one embodiment in which the middle upper region 20 includes a number of sleeping bunks or personal space units 25, usable as a passenger sleeping facility or crew rest facility. The embodiment further includes a galley 41 incorporating a galley cart storage area, a lavatory 42, and a closet or storage area 43. Note that alternate arrangements of these features, e.g., the use of transversely oriented bunks instead of longitudinally oriented bunks, are also feasible in variants of this embodiment.

The addition of a passageway between the forward and aft upper decks is desirable in that it provides an alternate exit route for the forward and aft upper deck passengers. In one embodiment, the pressurized passageway is sized to accommodate a standing adult of average height and width. As in the first embodiment, the middle region is of less height than either of the forward or aft double deck fuselage portions, thus maintaining the fuselage's two-humped appearance.

The amount of dip at the middle upper region will depend greatly on the particular aircraft size and configuration. In one embodiment, the upper exterior surface (crown line) of the middle upper region 20 is in the range of about 0.5 meters to about 1.5 meters below the upper exterior surface of the forward upper region.

The exterior shape of the present invention is not congruent with known aircraft design practices. In particular, the present invention two-humped exterior shape is contrary to typical structural design goals of providing maximum fuselage height to efficiently react fuselage bending moments. Thus, compared with a constant section double-deck airplane configuration, the upper surface dip in the fuselage has the appearance of being structurally non-optimal. Compared with a main deck only airplane or a partial upper deck only airplane having the same passenger count, the present invention two-humped configuration is more efficient on a per seat basis, since the single deck cross section over the wing will have to carry an even higher bending moment due to the considerably longer aft fuselage required to accommodate additional passengers.

Figure 5:
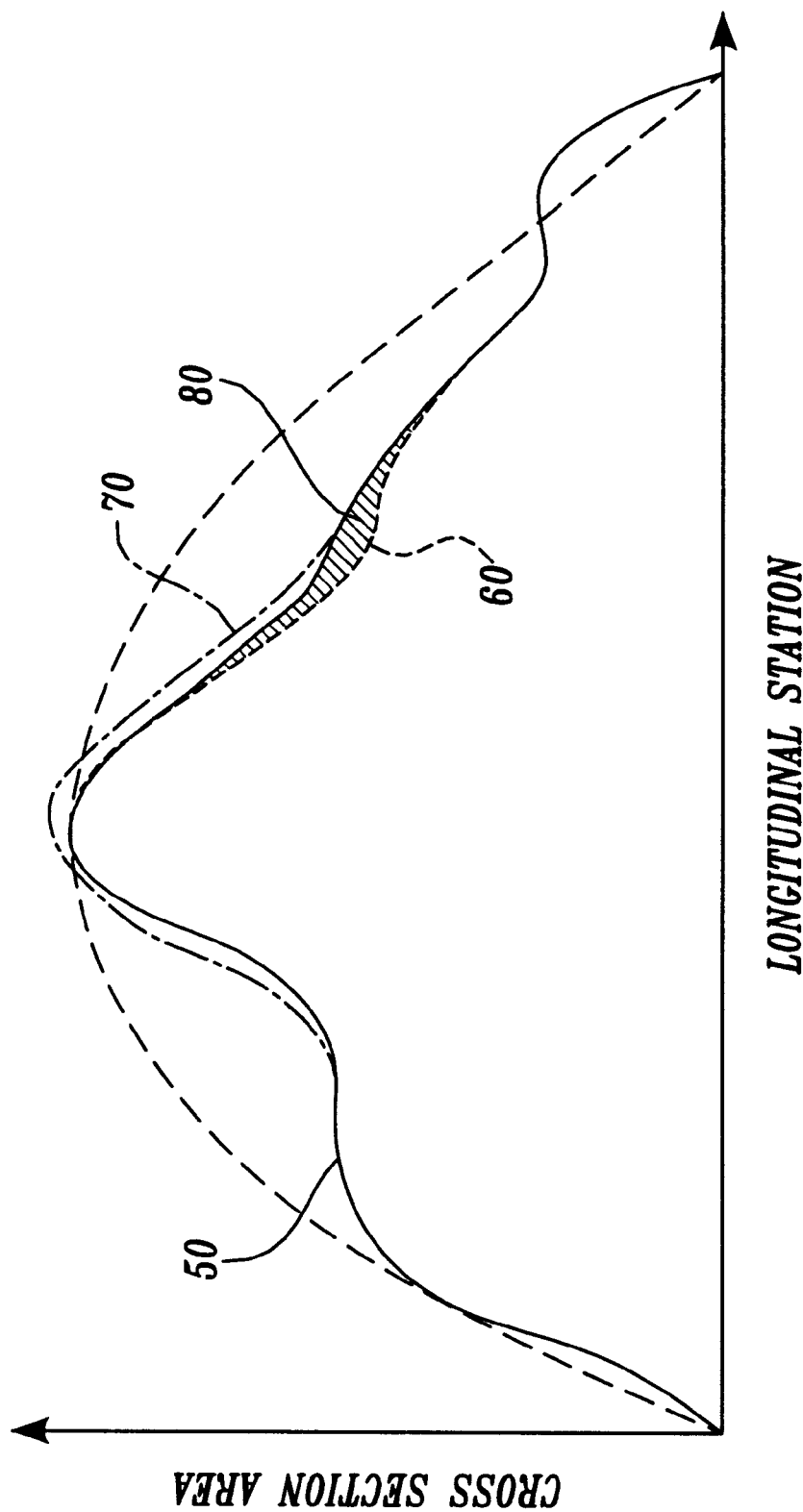
FIG. 5 is a plot of various cross-sectional areas shown relative to a plot of the optimal Whitcomb Curve.

The inventors herein have discovered that providing an upper surface dip can actually decrease aerodynamic drag, both parasite and wave drag. The benefits of these drag reductions exceeds any associated structural and weight penalties. FIG. 5 is a plot of volume distribution of an airplane formed in accordance with the present invention compared with the Whitcomb body volume distribution curve. As background regarding area-ruling theory, an important aerodynamic consideration in designing supersonic and high subsonic aircraft configurations is to minimize wave drag, a type of pressure drag due to the formation of shocks along the aircraft surfaces. Wave drag has been shown to be related to changes in the aircraft's cross-sectional area in the longitudinal direction, also referred to as "volume distribution." Several optimal body shapes have been found, the reference curve of FIG. 5 being that of a Whitcomb body. Thus, a good area distribution from a wave drag viewpoint has aircraft cross-sectional area changes distributed longitudinally in a fashion that fills the most area under the curve and that includes smooth transitions.

If a supersonic (and high subsonic) aircraft could be designed with a volume distribution similar to the Whitcomb distribution, such an aircraft would have minimum wave drag upon reaching supersonic speed, Mach 1.0. Since the main contributors to the cross-sectional area are the wing and the fuselage, the goal for most designers is to smooth the volume distribution shape. Some designers have done this for supersonic aircraft by narrowing the width of the fuselage at the wings, so that in planform view, the fuselage is given an hourglass or "Coke-bottle" shape. Coke-bottling has been applied to military airplanes having various weapon-type payloads and to fuselage structures housing fuel tanks. Horizontal area-ruling with integer passenger seats leads to inefficiencies within the transition areas, and as such is not considered a viable alternative.

The inventors herein have discovered that Coke-bottling the fuselage in the vertical plane to reduce the fuselage cross-sectional area at the location of the wings will also provide the desired area-ruling benefits. In addition, it allows a more efficient integer passenger seating arrangement. Furthermore, contrary to conventional aerodynamic fuselage design wisdom, an airplane having a fuselage formed in accordance with the present invention actually reduces the total amount of drag of the airplane on a per seat basis relative to either a full upper deck or a forward or aft upper deck alone. With the area ruling, a cruise speed benefit will also accrue, for a given wing design.

In more detail and referring to FIG. 5, the solid line 50 represents the area distribution curve for an aircraft configuration formed in accordance with the present invention. The dash line 60 represents an area distribution plot for known aircraft configurations having only a forward upward deck. Thus, the shaded region labeled 80 corresponds to a reduction in drag in the present invention plot 50 relative to the single upper forward deck configuration plot 60. The fineness ratio, that divides the total length by an equivalent diameter, is favorable (high) as the reduced body cross-sectional area coincides with the maximum wing cross section.

The dash-dot line 70 represents an area-ruling plot for a configuration having a full upper deck. The dash-dot line 70 would require a higher Whitcomb body curve since the largest area of the full upper deck configuration extends above the Whitcomb body curve shown. Increasing the Whitcomb body curve appropriately would leave an even larger void forward and aft of the wings, resulting in greater drag for this configuration. As will be appreciated from viewing FIG. 5, the contracted fuselage shape at the middle region of the present invention reduces the cross-sectional area thereat, thereby avoiding this excess.

Figure 4:
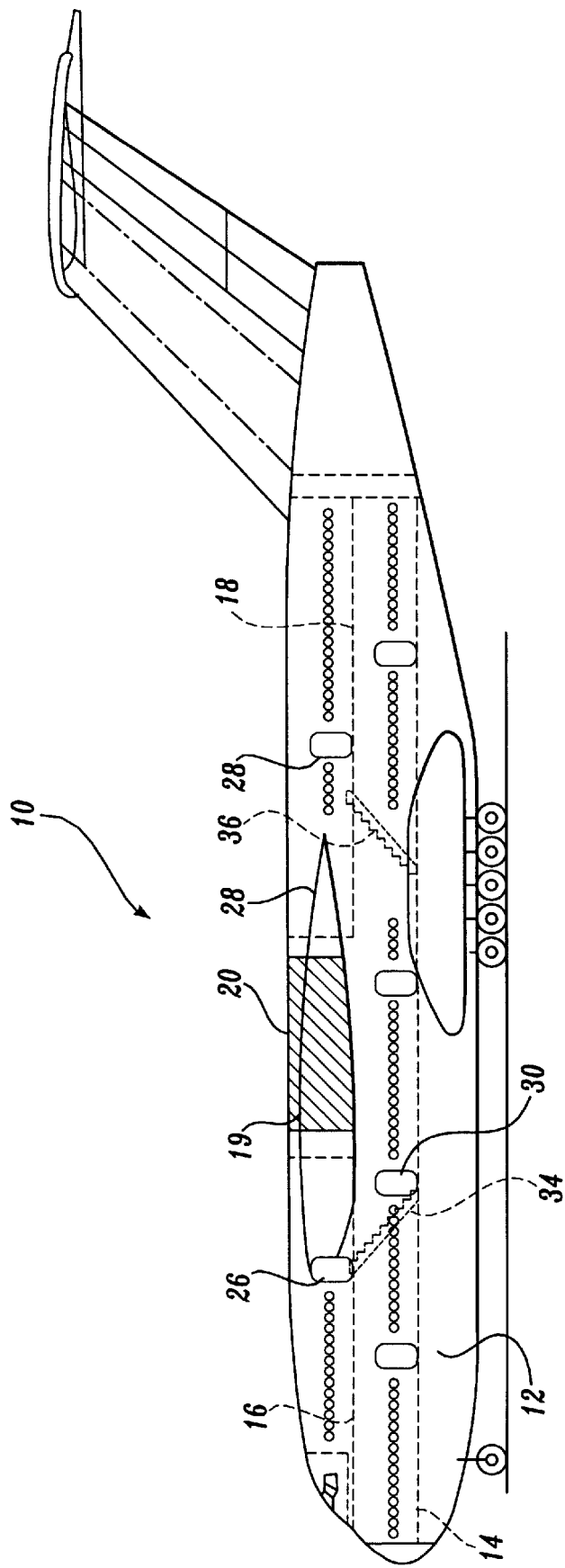
FIG. 4 is a side view of a third embodiment of a dual upper deck airplane formed in accordance with the present invention.

Referring to FIG. 4, a third embodiment of a dual upper deck airplane 10 formed in accordance with the present invention is provided. In this arrangement, the fuselage 12 has a main passenger seating deck 14, a forward upper passenger seating deck 16, and an aft upper passenger seating deck 18. A middle upper region 20 is provided within which a support box 19 of a high wing 21 is held. The fuselage at the middle region 20 has a cross-sectional area that is roughly the same size as either of the fuselage cross-sectional areas at the forward or aft upper decks.

Still referring to the embodiment of FIG. 4, the middle region 20 does not include a through passage or connect the forward and aft upper deck interiors in any way. The middle upper region is not available for entry into during flight. To exit the airplane during emergencies, one or more side door pairs 26, 28 are available in each of the forward and aft upper decks, respectively. The main deck 14 includes a number of pairs of side doors 30 spaced longitudinally along the fuselage. It is important to alternate the placement of the upper deck exit doors longitudinally with the main deck exit doors, so that their respective evacuation slides will not interfere with one another during use. Further, one or more stairs are provided between the forward upper deck and the main deck as indicated at item 34, and between the aft upper deck and the main deck as indicated at item 36.

As will be appreciated from the above, forward and aft upper deck designs of the above-described embodiments significantly increase passenger seating capacity without having to stretch the airplane. The first and second embodiments, have an additional benefit of avoiding the performance penalties of a full passenger upper deck design. These unique body geometries result in less wave drag and acceptable fuselage air flow characteristics. In all embodiments, the use of one or more upper deck exit door pairs in each upper cabin and spaced alternately with the main deck exit doors, allows passenger evacuation to be accomplished quickly and with minimal conflict.

While various preferred embodiments of the invention have been described and illustrated herein, it will be appreciated that various modifications can be made to the dual upper deck airplane without departing from either the spirit or scope of the present invention. The illustrated and described embodiments are thus to be considered as exemplary and the invention itself should be evaluated only as defined in the claims which follow.

The embodiments of the invention in which an exclusive property or privilege is claimed are defined as follows:

1. In a passenger aircraft having a fuselage including a main passenger seating deck including forward, middle, and aft regions, the fuselage further including an upper forward deck located above the main passenger seating deck forward region and accessible therefrom, both the main deck and upper forward deck having doors therein for passenger and supplies ingress and egress, the improvement comprising:

(a) an aft upper deck located above the main passenger seating deck aft region and accessible from the main deck aft region; and (b) an upper middle region located above the main deck middle region and having a height that is elevationally less than either of the forward and aft upper decks;

wherein the cross-sectional area of the fuselage at the upper middle region is less than the cross-sectional area of the fuselage at either the forward upper deck region or the aft upper deck region.

2. The improvement of claim 1, wherein the upper middle region is formed as an unpressurized fairing that provides no connection between the forward and aft upper decks.

3. The improvement of claim 1, wherein the upper middle region includes a pressured carry-through segment having a passageway that connects the forward and aft upper decks.

4. The improvement of claim 3, wherein the upper middle region includes one of sleeping, lavatory, storage, and galley facilities.

5. The improvement of claim 1, wherein the overall fuselage cross-sectional area is reduced in the longitudinal region between the forward and aft upper decks and in the longitudinal region of the wing, yielding a beneficial area-ruling drag reduction effect in transonic flow.

6. The improvement of claim 1, wherein the forward upper deck includes at least one pair of evacuation side doors and the aft upper deck includes at least one pair of evacuation side doors; the forward upper deck and the aft upper deck being treated as separate cabins for evacuation purposes.

7. The improvement of claim 1, wherein the fuselage exterior surface at the middle region is in the range of about 0.5 meters to about 1.5 meters lower than the forward upper region exterior surface crown line.

8. In a passenger transport aircraft having a wing and a fuselage, the fuselage including a main cabin for accommodating seated main cabin passengers, the main cabin including forward, middle, and aft regions, the improvement comprising:

(a) a forward upper cabin for accommodating seated forward upper cabin passengers, the forward upper cabin being situated substantially above the main cabin forward region; the forward upper cabin including at least one pair of forward upper cabin doors for permitting the forward upper cabin passengers to evacuate the forward upper cabin in an emergency situation; and (b) an aft upper cabin for accommodating seated aft upper cabin passengers, the aft upper cabin being situated substantially above the main cabin aft region; the aft upper cabin including at least one pair of aft upper cabin doors for permitting the aft upper cabin passengers to evacuate the aft upper cabin in an emergency situation;

wherein the forward upper cabin and the aft upper cabin are separate, longitudinally non-adjacent cabins for accommodating seated passengers.

9. The improvement according to claim 8, wherein an upper middle region is located between the forward upper cabin and the aft upper cabin, and includes an unpressurized fairing that permits no passage between the forward and aft upper cabins.

10. The improvement according to claim 8, wherein an upper middle region is located between the forward upper cabin and the aft upper cabin, and includes a pressurized passageway that permits passage between the forward and aft upper cabins.

11. The improvement according to claim 8, wherein an upper middle region is located between the forward upper cabin and the aft upper cabin, and includes at least one of the group comprising a crew rest facility, a passenger sleeping facility, a storage area, a lavatory, and a galley.

12. The improvement according to claim 8, wherein the fuselage cross-sectional area is reduced in the longitudinal region between the forward upper cabin and the aft upper cabin yielding a beneficial area-ruling drag reduction effect in transonic flight.

13. The improvement according to claim 8, wherein the fuselage height as measured vertically between the crown and the keel of the fuselage is reduced in the longitudinal region between the forward upper cabin and the aft upper cabin.

14. The improvement according to claim 8, wherein an upper middle region is located between the forward upper cabin and the aft upper cabin, and wherein the crown of the fuselage in the upper middle region is in the range of about 0.5 to about 1.5 meters lower than the crown of one of the forward and aft upper cabins.

15. The improvement according to claim 8, wherein the wing is located below the level of the main cabin.

16. The improvement according to claim 8, wherein the wing is located above the level of the main cabin.

17. The improvement according to claim 8, wherein the longitudinal distance between the aft edge of the aftmost door of the forward upper cabin doors and the forward edge of the forwardmost door of the aft upper cabin exceeds sixty feet.

18. The improvement according to claim 8, wherein the forward upper cabin includes at least one stairway connecting it to the main deck forward region and the aft upper cabin includes at least one stairway connecting it to the main deck aft region.

19. In a passenger transport aircraft having a wing and a fuselage, the fuselage including a main cabin for accommodating seated main cabin passengers, the main cabin including forward, middle, and aft regions, the fuselage at the main cabin including a plurality of main cabin doors and an associated plurality of deployable escape slides for permitting the main cabin passengers to evacuate the main cabin in an emergency situation, the improvement comprising:

(a) a forward upper cabin for accommodating seated forward upper cabin passengers, the forward upper cabin being situated substantially above the main cabin forward region; and (b) an aft upper cabin for accommodating seated aft upper cabin passengers, the aft upper cabin being situated substantially above the main cabin aft region;

wherein the forward upper cabin and the aft upper cabin are separate, longitudinally non-adjacent cabins for accommodating seated passengers;

wherein the forward upper cabin is fitted with at least one pair of forward upper cabin doors and associated deployable escape slides for permitting the forward upper cabin passengers to evacuate the forward upper cabin in an emergency situation;

wherein the aft upper cabin is fitted with at least one pair of aft upper cabin doors and associated deployable escape slides for permitting the aft upper cabin passengers to evacuate the aft upper cabin in an emergency situation;

wherein the forward upper cabin doors are located forward of the wing to prevent the forward upper cabin escape slides from being contacted or deflected by the wing or by any engine installed on the wing while the forward upper cabin escape slides are deploying or deployed; and wherein the aft upper cabin doors are located aft of the wing to prevent the aft upper cabin escape slides from being contacted or deflected by the wing or by any engine installed on the wing while the aft upper cabin escape slides are deploying or deployed.

* * * * *